United States Patent
Seo et al.

(10) Patent No.: US 10,394,459 B2
(45) Date of Patent: Aug. 27, 2019

(54) DATA STORAGE DEVICE FOR FILTERING PAGE IN TWO STEPS, SYSTEM INCLUDING THE SAME, AND METHOD OF OPERATING THE SAME

(71) Applicant: SAMSUNG ELECTRONICS CO., LTD., Suwon-si, Gyeonggi-Do (KR)

(72) Inventors: Man Keun Seo, Hwaseong-si (KR); Kwang Hoon Kim, Seoul (KR); Sang Kyoo Jeong, Seoul (KR); Kwang Seok Im, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 290 days.

(21) Appl. No.: 14/623,080

(22) Filed: Feb. 16, 2015

(65) Prior Publication Data

US 2015/0234602 A1 Aug. 20, 2015

(30) Foreign Application Priority Data

Feb. 17, 2014 (KR) .................. 10-2014-0017976

(51) Int. Cl.
*G06F 3/06* (2006.01)
*G06F 13/28* (2006.01)

(52) U.S. Cl.
CPC .......... *G06F 3/0611* (2013.01); *G06F 3/0656* (2013.01); *G06F 3/0679* (2013.01); *G06F 13/28* (2013.01); *Y02D 10/14* (2018.01)

(58) Field of Classification Search
None
See application file for complete search history.

(56) References Cited

U.S. PATENT DOCUMENTS

| 7,047,374 B2 | 5/2006 | Sah et al. |
| 7,730,077 B2 | 6/2010 | Hinshaw et al. |
| 8,229,918 B2 | 7/2012 | Branscome et al. |
| 8,327,066 B2 | 12/2012 | Heo et al. |
| 8,355,411 B2 | 1/2013 | Millet et al. |
| 8,380,915 B2 | 2/2013 | Wood et al. |
| 8,402,152 B2 | 3/2013 | Duran |
| 2004/0049636 A1* | 3/2004 | Campbell ........... G06F 12/0866 711/130 |
| 2004/0172400 A1 | 9/2004 | Zarom et al. |
| 2004/0205110 A1 | 10/2004 | Hinshaw |

(Continued)

OTHER PUBLICATIONS

Kim, Sunghcan, "Accelerating Database Machine Using In-Storage Processing Inside SSDs," NVRAMOS 2011 Fall Operating System Support for Next Generation Arge Scale NVRAM.

(Continued)

*Primary Examiner* — Henry Tsai
*Assistant Examiner* — Christopher A Bartels
(74) *Attorney, Agent, or Firm* — Volentine, Whitt & Francos, PLLC (57) ABSTRACT

A data storage device includes a filter, a central processing unit (CPU), a first memory configured to store a page, a second memory, and a page type analyzer configured to analyze a type of the page output from the first memory and to transmit an indication signal to the CPU according to an analysis result. According to control of the CPU that operates based on the indication signal, the filter passes the page to the second memory or filters each row in the page, and transmits first filtered data to the second memory.

19 Claims, 9 Drawing Sheets

(56) References Cited

U.S. PATENT DOCUMENTS

| | | | |
|---|---|---|---|
| 2005/0198008 A1* | 9/2005 | Adler | G06F 17/30533 |
| 2006/0061795 A1* | 3/2006 | Walmsley | G06F 21/75 |
| | | | 358/1.14 |
| 2006/0206687 A1* | 9/2006 | Vega | G06F 12/10 |
| | | | 711/206 |
| 2007/0208885 A1* | 9/2007 | Otsuka | G06F 12/0804 |
| | | | 710/22 |
| 2012/0137075 A1* | 5/2012 | Vorbach | G06F 9/526 |
| | | | 711/122 |
| 2013/0024460 A1* | 1/2013 | Peterson | G06F 3/061 |
| | | | 707/741 |
| 2013/0024645 A1* | 1/2013 | Cheriton | G06F 12/10 |
| | | | 711/206 |
| 2013/0042052 A1* | 2/2013 | Colgrove | G06F 3/0608 |
| | | | 711/103 |
| 2013/0060993 A1 | 3/2013 | Park et al. | |
| 2013/0086301 A1 | 4/2013 | Cleveland et al. | |
| 2013/0166820 A1* | 6/2013 | Batwara | G06F 12/0246 |
| | | | 711/103 |
| 2014/0208004 A1* | 7/2014 | Cohen | G06F 12/0246 |
| | | | 711/103 |
| 2014/0304460 A1* | 10/2014 | Carlson, Jr. | G06F 15/167 |
| | | | 711/103 |
| 2015/0127911 A1* | 5/2015 | Steiss | G06F 12/0871 |
| | | | 711/123 |

OTHER PUBLICATIONS

Cho, Sangyeon, "Active Disk Meets Flash: a Case for Intelligent SSDs," CMU-PDL-11-115, Nov. 2011.

Database Pages :: Chapter 33. SQL Server Internals :: Part V: SQL Server Internals and Performance Tuning :: Microsoft SQL Server 2000 :: SQL :: eTutorials.org.

Kim, Sungchan, "Fast, Energy Efficient Scan Inside Flash Memory SSDs,".

Cho, Sangyeun, "How Smart Can Your SSD Be?".

Tsirogiannis, Dimitris, "Query Processing Techniques for Solid State Drives,".

* cited by examiner

PAGE1

| PID | NAME | ADDRESS | CITY |
|---|---|---|---|
| 1 | NAME1 | ADD1 | CITY1 |
| 2 | NAME2 | ADD2 | CITY2 |
| 3 | NAME3 | ADD3 | CITY1 |
| 4 | NAME4 | ADD4 | CITY2 |

PAGE2

| PID | NAME | ADDRESS | CITY |
|---|---|---|---|
| 5 | NAME5 | ADD1 | CITY1 |
| 6 | NAME6 | ADD5 | CITY3 |
| 7 | NAME7 | ADD3 | CITY1 |
| 8 | NAME8 | ADD6 | CITY4 |

DATA STORAGE DEVICE FOR FILTERING PAGE IN TWO STEPS, SYSTEM INCLUDING THE SAME, AND METHOD OF OPERATING THE SAME

CROSS-REFERENCE TO RELATED APPLICATIONS

A claim of priority under 35 U.S.C. § 119(a) is made to Korean Patent Application No. 10-2014-0017976 filed on Feb. 17, 2014, the disclosure of which is hereby incorporated by reference in its entirety.

BACKGROUND

Embodiments of the present disclosure relate to a data storage device, and more particularly, to a data storage device for sequentially performing hardware filtering and software filtering, a system including the same, and a method of operating the data storage device.

In data server systems including a normal server and a database, a massive amount of data (herein below referred to as "big data") is stored in a relational database or a NoSQL database. Data that is desired is extracted from among the big data stored in the relational database or the NoSQL database using a structured query language (SQL) or a unique query language.

The big data is transmitted from the database to a main memory of a server, and a processor of the server extracts the desired data from among the big data stored in the main memory. However, since only part of the big data stored in the main memory of the server is extracted by the processor of the server, extraction of the desired data using the processor of the server is not efficient in terms of data traffic. Moreover, since the big data is transmitted from the database to the server, the data traffic between the server and the database is not decreased.

SUMMARY

Some embodiments of the present disclosure provide a data storage device capable of sequentially performing hardware filtering and software filtering, thereby reducing data traffic to a host and operations (or a number of computations of a central processing unit (CPU)) of the host, a system including the same, a method of operating the data storage device.

According to some embodiments of the present disclosure, there is provided a data storage device including a filter, a central processing unit (CPU), a first memory configured to store a page, a second memory, and a page type analyzer configured to analyze a type of the page that is output from the first memory and to transmit an indication signal to the CPU according to an analysis result. According to control of the CPU that operates based on the indication signal, the filter may bypass the page to the second memory or may filter each row in the page and transmit first filtered data to the second memory.

The CPU may filter the first filtered data that is output from the second memory and may transmit second filtered data to the second memory.

The filter may perform filtering on a plurality of columns included in the row based on a priority. Thus, the filter may firstly perform the filtering on a column having a highest priority among the plurality of columns in the row. The filter may process the page in units of rows using a direct memory access (DMA) function.

The data storage device may further include a low-latency memory and a hardware accelerating logic circuit. At this time, the filter may include a buffer configured to buffer the page and a DMA controller. The CPU may store data structure information of the page that is output from the buffer in the low-latency memory. The hardware accelerating logic circuit may calculate an offset and a size of each row from the data structure information stored in the low-latency memory and may generate a DMA parameter set corresponding to a calculation result. The DMA controller may perform the filtering on each row sequentially using the DMA parameter set.

Alternatively, the data storage device may further include a low-latency memory. At this time, the filter may include a buffer configured to buffer the page and a DMA controller. The CPU may store data structure information of the page that is output from the buffer in the low-latency memory, calculate an offset and a size of the row from the data structure information stored in the low-latency memory, and generate a DMA parameter corresponding to a calculation result. The DMA controller may perform the filtering on the row using the DMA parameter.

The data storage device may further include a memory controller configured to control an operation of the first memory. The first memory may be a flash memory and the second memory may be a dynamic random access memory (DRAM). The filter, the CPU, and the memory controller may be included in a system on chip (SoC). The data storage device may be a solid state drive (SSD).

According to other embodiments of the present disclosure, there is provided a data processing system including the above-described data storage device and a host configured to transmit at least one query related with filtering of the filter and a query related with filtering of the CPU to the data storage device.

According to further embodiments of the present disclosure, there is provided a method of filtering data using a data storage device which includes a hardware filter and a CPU. The method includes analyzing a type of a page that is output from a first memory using a page type analyzer, bypassing the page to a second memory using the hardware filter or filtering the page in units of rows using the hardware filter, and transmitting first filtered data to the second memory according to an analysis result. The method may further include filtering the first filtered data that is output from the second memory using the CPU and transmitting second filtered data to the second memory.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE EMBODIMENTS

The present disclosure now will be described more fully hereinafter with reference to the accompanying drawings, in which embodiments of the present disclosure are shown. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
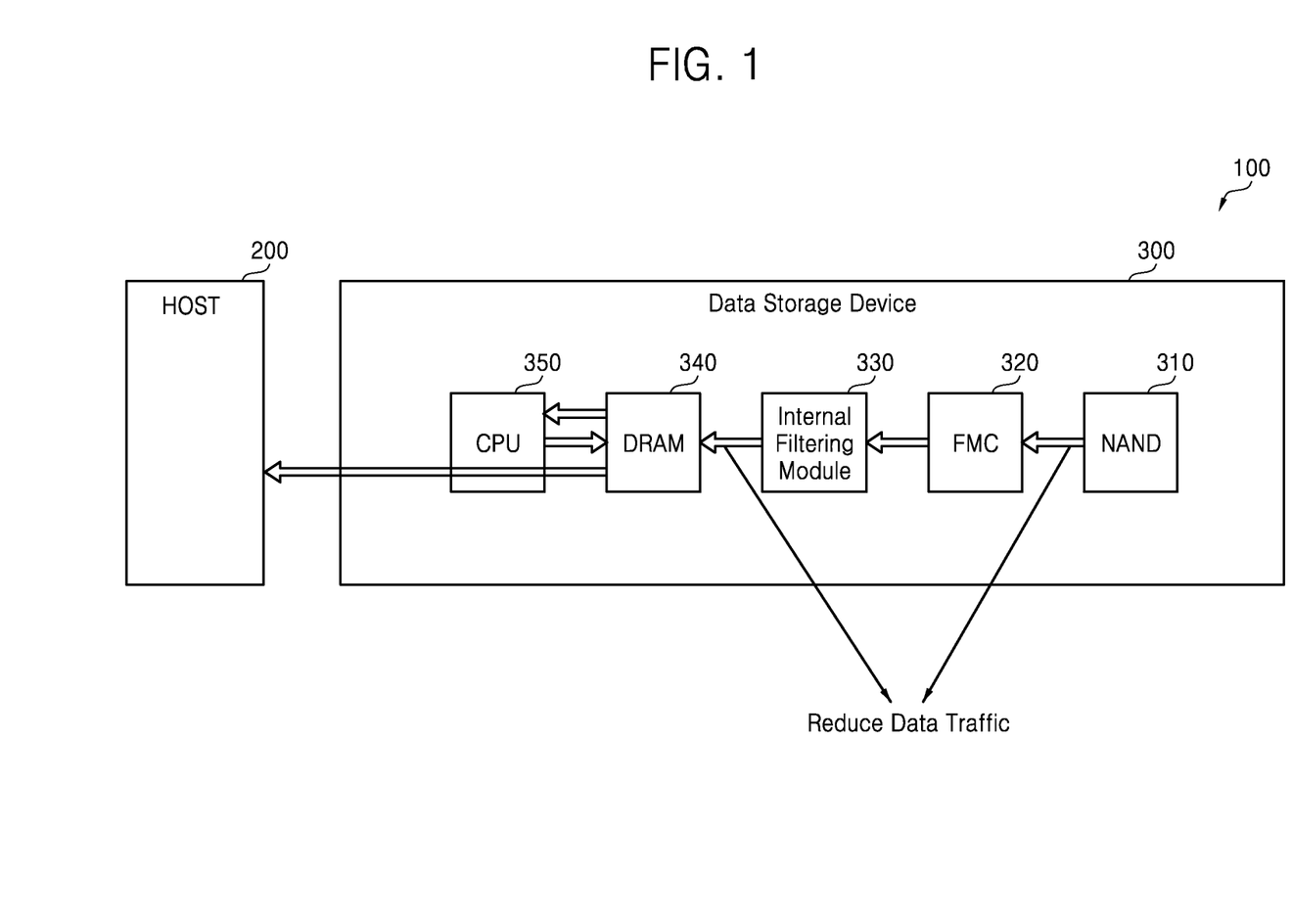
FIG. 1 is a schematic block diagram of a data management system according to some embodiments of the present disclosure.

FIG. 1 is a schematic block diagram of a data management system 100 according to some embodiments of the present disclosure. Referring to FIG. 1, the data management system or data processing system 100 includes a host 200 and a data storage device 300.

The data management system 100 may be a database management system (DBMS) or a relational DBMS (RD-BMS). The DBMS may include a column-oriented DBMS or a row-oriented DBMS. MySQL, PostgreSQL, SQLite, Microsoft SQL Server, Microsoft Access, Oracle, SAP, dBASE, FoxPro, IBM DB2, and FilemakerPro are well-known DBMSs.

In spite of the name, the data management system 100 may be implemented as a server system including the data storage device 300, a personal computer (PC), or a portable electronic device. The portable electronic device may be a laptop computer, a mobile phone, a smart phone, a table PC, a mobile internet device (MID), a wearable computer, an internet of things (IoT) device, or an internet of everything (IoE) device.

The data management system 100 may perform data searching function (or data search) and data filtering function (or data filtering). For example, the data filtering may be a process of sorting (for example, including a logic operation) data stored in the data storage device 300 at the request of the host 200.

In some embodiments, the data search and the data filtering may be performed first in the data storage device 300, and the result of the search and the filtering may be transmitted to the host 200. In other embodiments, the data filtering may be partially performed in the data storage device 300, and the filtering result may be transmitted to the host 200. At this time, the host 200 may perform additional data filtering on the filtering result.

When both the data search and the data filtering are performed first in the data storage device 300, there may be following advantages.

Firstly, since the data search and the data filtering are performed by an internal filtering module (or a hardware filter) 330 implemented within the data storage device 300, operations (or a number of computations) of a central processing unit (CPU) (210 in FIG. 2) in the host 200 is reduced. As a result, the performance of the data management system 100 is increased. In particular, when the internal filtering module 330 is implemented in dedicated hardware for the data filtering, data can be processed faster than when the data is processed using only the CPU 210 in the host 200.

In addition, when the data management system 100 includes a plurality of data storage devices, the data management system 100 may process the data in parallel using the plurality of data storage devices. Therefore, the performance of the data management system 100 is increased. At this time, structure and an operation of the plurality of data storage devices are substantially the same as those of the data storage device 300.

Secondly, power consumption of a CPU 350 in the data storage device 300 and/or power consumption of the internal filtering module 330 are relatively less than that of the CPU 210 in the host 200, and therefore, the overall power consumption of the data management system 100 is effectively reduced.

Thirdly, when the internal filtering module 330 is placed (or positioned) near an auxiliary memory (or a first memory)

310, as illustrated in FIG. 1, unnecessary data transmission is reduced in light of a data path. At this time, the internal filtering module 330 may transmit only necessary data to a main memory (or a second memory) 340 through hardware filtering. As a result, data traffic for data transmission between the auxiliary memory 310 and the main memory 340 is reduced. At the same time, the data traffic from the main memory 340 to the host 200 is reduced.

As described above, since the data storage device 300 may reduce the data traffic from the auxiliary memory 310 to the main memory 340, the amount of data to be processed by the CPU 350 in the data storage device 300 may also be reduced. As a result, as well as the operational amount of the CPU 350 in the data storage device 300, the operational amount of the CPU 210 in the host 200 is reduced.

The host 200 may control a data processing operation, e.g., a data write operation, a data read operation, or a filtering operation (e.g., a hardware filtering operation and a software filtering operation) of the data storage device 300.

The term "hardware filtering" or "hardware filtering operation" indicates filtering or the filtering operation performed by the internal filtering module 330. The term "software filtering" or "software filtering operation" indicates filtering or the filtering operation performed by software (or firmware) executed by the CPU 350 in the data storage device 300. Accordingly, the data storage device 300 may perform a 2-step filtering operation. Data subjected to the data processing operation may include big data.

The host 200 and the data storage device 300 may communicate with each other using serial advance technology attachment (SATA), serial attached SCSI (SAS), or peripheral component interconnect express (PCIe). The host 200 and the data storage device 300 may also receive or transmit data with each other via a wired/wireless network, e.g., an internet network or a Wi-Fi network.

The data storage device 300 may be implemented as an all-in-one data storage device. For instance, the data storage device 300 may be implemented as a solid state drive (SSD), an embedded SSD (eSSD), or a hard disc drive (HDD).

Figure 2:
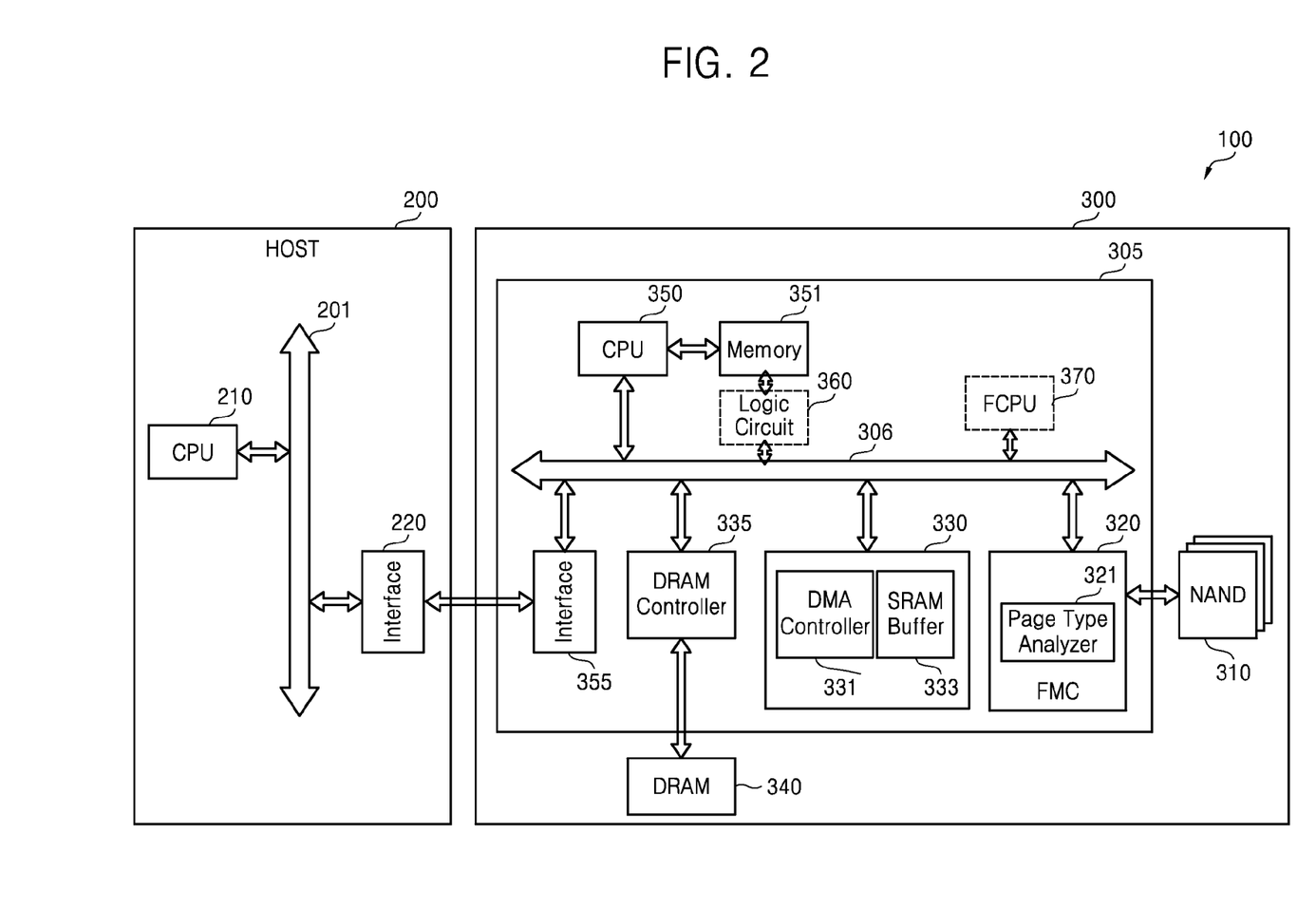
FIG. 2 is a detailed block diagram of the data management system according to some embodiments of the present disclosure.

FIG. 2 is a detailed block diagram of the data management system 100. Referring to FIGS. 1 and 2, the host 200 includes the CPU 210 and an interface 220. Although not shown, the host 200 may also include a memory controller for processing second filtered data, a memory for storing the processed data, and/or an interface for transmitting the processed data to another device.

The CPU 210 may control the overall operation of the host 200 and control the interface 220 via a bus 201. The CPU 210 may generate data, control signals, and/or commands for controlling the operation of the data storage device 300, and may transmit the data, the control signals, and/or the commands to the data storage device 300 through the interface 220. The CPU 210 may generate a query related with hardware filtering and software filtering, and may transmit the query to the data storage device 300 through the interface 220. The host 200 may receive data filtered by the data storage device 300 and may process the filtered data.

The data storage device 300 may perform the hardware filtering using the internal filtering module 330. The CPU 350 may perform the software filtering of the hardware-filtered data and may transmit the software-filtered data to the host 200. The data storage device 300 may include a control circuit 305, the auxiliary memory (or a first memory) 310, and the main memory (or a second memory) 340.

The control circuit 305 may perform data access operations (e.g., a data write operation and a data read operation) with respect to the auxiliary memory 310 and the main memory 340, respectively. The control circuit 305 may also control the hardware filtering and the software filtering. The control circuit 305 may be implemented in a printed circuit board (PCB), an integrated circuit (IC), or a system on chip (SoC).

In some embodiments, the control circuit 305 may include an auxiliary memory controller (or a first memory controller) 320, an internal filtering module 330, a main memory controller (or a second memory controller) 335, a CPU 350, an internal memory 351, and an interface 355. In other embodiments, the control circuit 305 may also include a hardware accelerating logic circuit 360 and/or a flash CPU (FCPU) 370.

The auxiliary memory controller 320 may write the data to the auxiliary memory 310 or may read the data from the auxiliary memory 310. The auxiliary memory 310 may include one or more memory chips.

Here, the data that is output from the auxiliary memory 310 for 2-step filtering is referred to as a page (or page data or a database page). For instance, the page may be 1 KB, 2 KB, 4 KB, or 8 KB in length, but this is just an example. Data structure of the page may be configured in various manners. For instance, the page may indicate a size of the data stored in the data storage device 300.

The auxiliary memory controller 320 may include a page type analyzer 321, which may be implemented in hardware. For instance, the page type analyzer 321 may be a device that recognizes the characteristic of the data (or page) stored in the data storage device 300. The page type analyzer 321 may be implemented in software in other embodiments. The auxiliary memory controller 320 may be referred to as a flash memory controller (FMC).

In some embodiments, the control circuit 305 may include the FCPU 370 that controls an operation of the auxiliary memory controller 320. However, in some embodiments, when the control circuit 305 does not include the FCPU 370, the CPU 350 may control the operation of the auxiliary memory controller 320. Each of the CPU 350 and the FCPU 370 may include one or more cores.

The page type analyzer 321 may analyze whether the page that is output from the auxiliary memory 310, e.g., a flash memory is an index page including an index or a user data page including user data, and may transmit an indication signal to the CPU 350 according to the analysis result.

The auxiliary memory controller 320 may transmit the page from the auxiliary memory 310 to a buffer, e.g., a static random access memory (SRAM) buffer 333 of the internal filtering module 330 via a bus 306. According to control of the CPU 350 that operates based on the indication signal, the internal filtering module 330, and in particular, a direct memory access (DMA) controller 331 included in the internal filtering module 330, may pass the index page to the main memory 340 via the main memory controller 335.

According to the control of the CPU 350 that operates based on the indication signal, the internal filtering module 330, and in particular, the DMA controller 331, may filter the user data page in units of rows using the hardware filtering, and may transmit first filtered data corresponding to the filtering result to the main memory 340 via the main memory controller 335. In the context of a relational database, a row may be referred to as a record or a tuple, and a column may be referred to as a field or an attribute.

The CPU 350 may store in the internal memory 351 the first filtered data received from the main memory 340 via the main memory controller 335, perform the software filtering on the first filtered data stored in the internal memory 351, and transmit second filtered data corresponding to the software filtering result to the main memory 340 via the main memory controller 335.

The internal memory 351 may be a low-latency memory that can be accessed by the CPU 350. For instance, the internal memory 351 may be implemented as a tightly coupled memory (TCM) or an SRAM.

The second filtered data that is output from the main memory 340 is transmitted to the host 200 via the main memory controller 335 and the interface 355.

The auxiliary memory 310 may be implemented as a non-volatile memory such as a flash memory. The flash memory may be a NAND flash memory or a NOR flash memory. The main memory 340 may be implemented as a volatile memory such as a DRAM.

Figure 3:
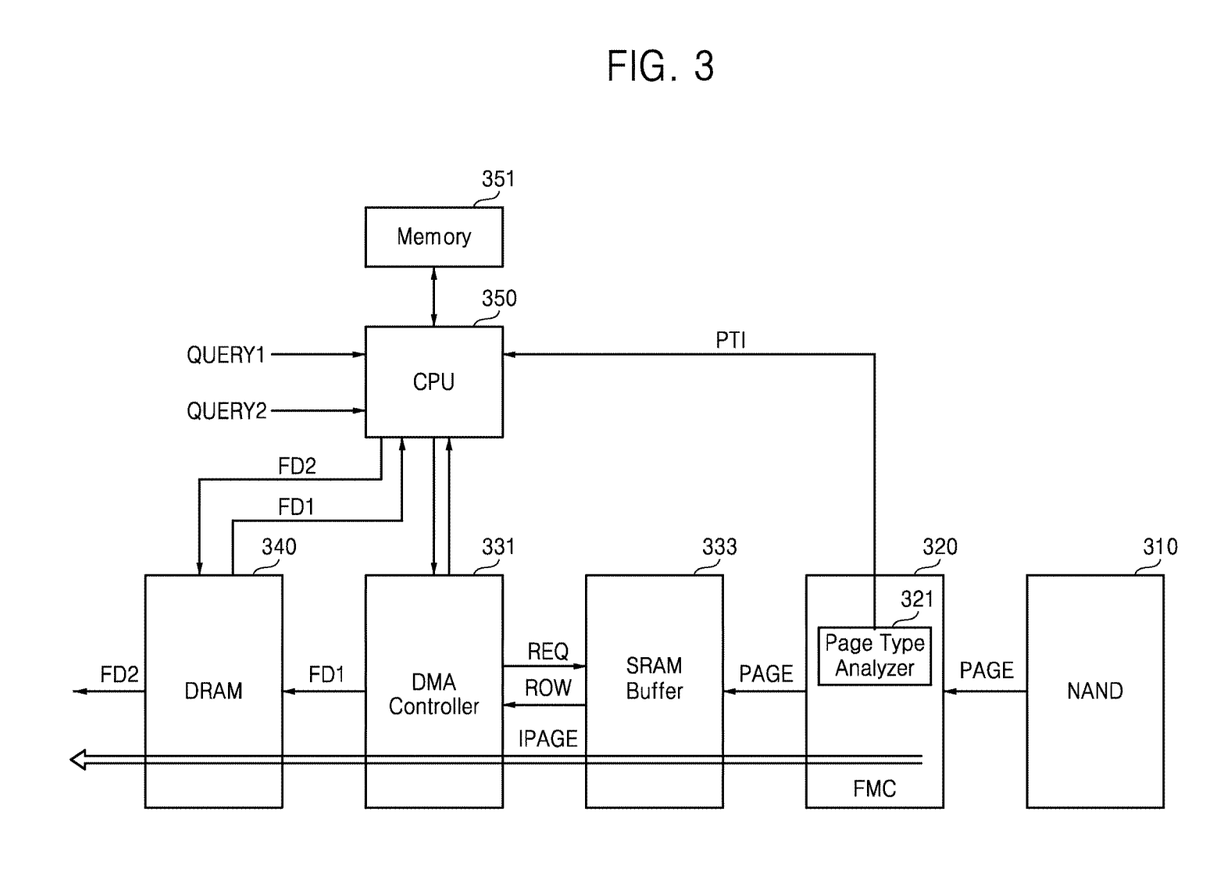
FIG. 3 is a detailed block diagram of a data storage device illustrated in FIG. 2 according to some embodiments of the present disclosure.
Figure 4:
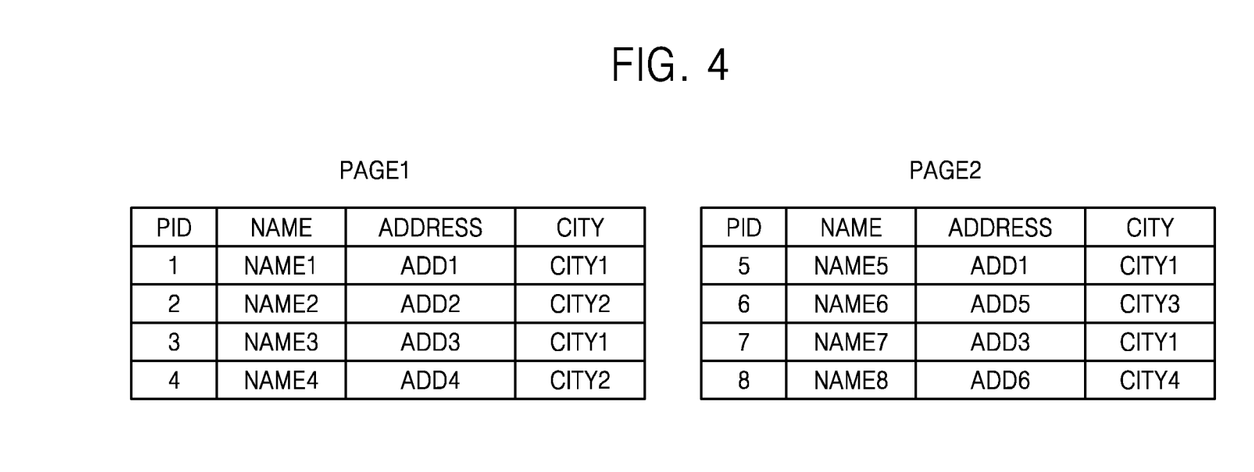
FIG. 4 is a diagram of pages to be filtered by the data storage device illustrated in FIG. 2.
Figure 5:
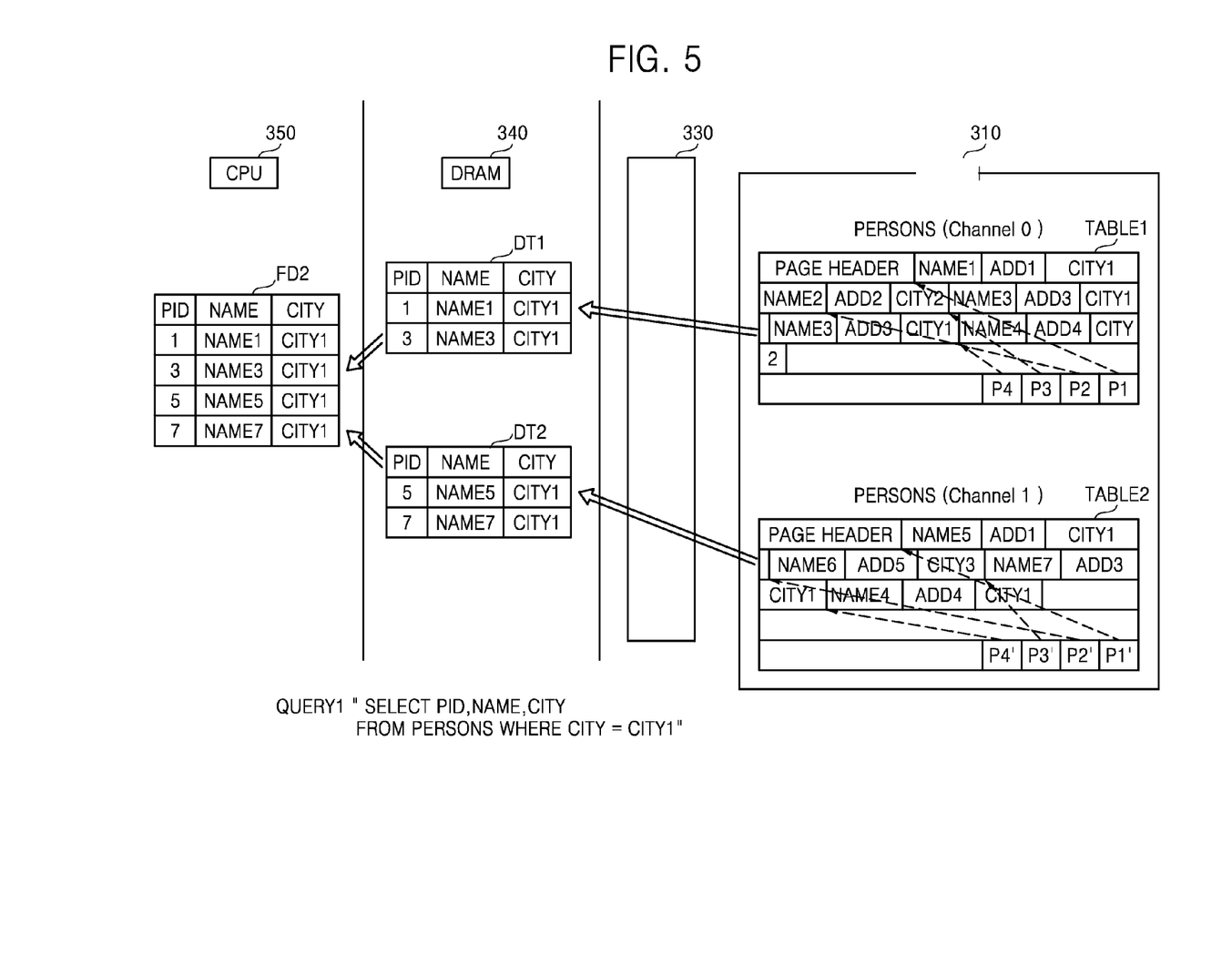
FIG. 5 is a conceptual diagram explaining a procedure in which the data storage device illustrated in FIG. 2 filters the pages illustrated in FIG. 4.

FIG. 3 is a detailed block diagram of the data storage device 300 illustrated in FIG. 2 according to some embodiments of the present disclosure. FIG. 4 is a diagram of pages to be filtered by the data storage device 300 illustrated in FIG. 2. FIG. 5 is a conceptual diagram explaining a procedure in which the data storage device 300 illustrated in FIG. 2 filters the pages illustrated in FIG. 4. A procedure in which the data storage device 300 extracts a row including only "CITY1" from each of pages PAGE1 and PAGE2 in response to queries QUERY1 and QUERY2, and transmits extracted data to the main memory 340 will be described with reference to FIGS. 1 through 4.

It is assumed that the query QUERY1 is "SELECT PID, NAME, CITY FROM PERSONS WHERE CITY= 'CITY1'" and the query QUERY2 is "SELECT PID, NAME, CITY FROM PERSONS WHERE CITY= 'CITY1'".

According to embodiments, the query QUERY1 related with the hardware filtering may be the same as or different from the query QUERY2 related with the software filtering.

It is also assumed that each of the first and second pages PAGE1 and PAGE2 includes four columns, PID, NAME, ADDRESS, and CITY, and that each of the first and second pages PAGE1 and PAGE2 is user data page. It is also assumed that the first page PAGE1 is stored in a first table TABLE1 of a first NAND flash memory chip through a first channel Channel0 under the name of "PERSONS", and that the second page PAGE2 is stored in a second table TABLE2 of a second NAND flash memory chip through a second channel Channel1 under the name of "PERSONS". Moreover, it is assumed that the auxiliary memory 310 includes the first NAND flash memory chip and the second NAND flash memory chip.

When the first page PAGE1 is transmitted to the auxiliary memory controller 320 via the first channel Channel0, the page type analyzer 321 may analyze a type of the first page PAGE1. Since the first page PAGE1 is not the index page but the user data page, the page type analyzer 321 may transmit an indication signal PTI indicating that the first page PAGE1 is the user data page to the CPU 350 via the bus 306. The auxiliary memory controller 320 may transmit the first page PAGE1 from the auxiliary memory controller 320 to the SRAM buffer 333.

The timing at which the indication signal PTI is transmitted to the CPU 350 and the timing at which the first page PAGE1 is transmitted to the SRAM buffer 333 may be set variously according to a design specification of the data storage device 300.

Information (hereinafter, referred to as "data structure information") about the data structure of the first page PAGE1 stored in the SRAM buffer 333 is transmitted to the internal memory 351. The data structure information includes a page header PAGE HEADER and pointers P1, P2, P3, and P4 of the first page PAGE1. A method of transmitting the data structure information from the SRAM buffer 333 to the internal memory 351 may be variously changed according to the design specification. For instance, the data structure information may be transmitted to the internal memory 351 through the DMA controller 331 and/or the CPU 350.

The CPU 350 or software (or firmware) executed by the CPU 350 may extract an offset (or a pointer) of each row and a size of the row based on the data structure information stored in the internal memory 351. In detail, the CPU 350 or software (or firmware) executed by the CPU 350 may extract position information of each of columns included in the row. The CPU 350 may configure (or set) the DMA controller 331 based on the query QUERY1 and the extracted information so that the DMA controller 331 can perform the hardware filtering on each row.

For instance, the DMA controller 331 may transmit a DMA request REQ requesting transmission of the first row in the first page PAGE1 to the SRAM buffer 333. The SRAM buffer 333 may transmit the first row ROW to the DMA controller 331.

The DMA controller 331 may extract three columns, i.e., PID=1, NAME=NAME1 and CITY=CITY1 corresponding to the query QUERY1 from the first row including four columns, i.e., PID=1, NAME=NAME1, ADDRESS=ADD1 and CITY=CITY1, and may determine whether the column CITY includes "CITY1". At this time, the column CITY having the highest priority among the three extracted columns, PID=1, NAME=NAME1, and CITY=CITY1 is the first to be subjected to a comparison. For instance, a column (e.g., CITY) including data (e.g., CITY1) to be extracted (or filtered) may be given the highest priority.

Since the corresponding column CITY includes "CITY1" defined in the query QUERY1, the DMA controller 331 may output the first row including the three columns, PID=1, NAME=NAME1, and CITY=CITY1, as first filtered data FD1. The first filtered data FD1 is stored in the main memory 340 through the bus 306 and the main memory controller 335.

The DMA controller 331 may transmit the DMA request REQ requesting transmission of the second row in the first page PAGE1 to the SRAM buffer 333. The SRAM buffer 333 may transmit the second row to the DMA controller 331. The DMA controller 331 may extract three columns, i.e., PID=2, NAME=NAME2 and CITY=CITY2 corresponding to the query QUERY1 from the second row including four columns, i.e., PID=2, NAME=NAME2, ADDRESS=ADD2 and CITY=CITY2, and may determine whether the column CITY includes "CITY1".

As described above, the column CITY having the highest priority among the three extracted columns, PID=2, NAME=NAME2, and CITY=CITY2 is the first to be subjected to a comparison.

Since the corresponding column CITY does not include "CITY1" defined in the query QUERY1, the DMA controller 331 does not output the second row including the three columns, PID=2, NAME=NAME2, and CITY=CITY2. At this time, the second row may be discarded. Through such a procedure, the DMA controller 331 may output the third row including three columns, i.e., PID=3, NAME=NAME3 and CITY=CITY1, and does not output the fourth row including three columns, i.e., PID=4, NAME=NAME4 and CITY=CITY2.

Continuously, the auxiliary memory controller 320 may transmit the second page PAGE2 from the auxiliary memory 310 to the SRAM buffer 333.

The data structure information of the second page PAGE2 stored in the SRAM buffer 333 may be transmitted to the internal memory 351. The data structure information may include a page header PAGE HEADER and pointers P1', P2', P3', and P4' of the second page PAGE2.

The second page PAGE2 may be hardware-filtered in substantially the same way as the first page PAGE1 is hardware-filtered.

The DMA controller 331 may transmit the DMA request REQ requesting transmission of a row in the second page PAGE2 to the SRAM buffer 333. Accordingly, the SRAM buffer 333 may transmit the corresponding row to the DMA controller 331. The DMA controller 331 may output the first row including three columns, PID=5, NAME=NAME5, and CITY=CITY1, and may also output the third row including three columns, i.e., PID=7, NAME=NAME7, and CITY=CITY1. However, the DMA controller 331 may not output the second row including three columns, PID=6, NAME=NAME6, and CITY=CITY3, and may not also output the fourth row including three columns, i.e., PID=8, NAME=NAME8, and CITY=CITY4.

Through the above-described process, data DT1 extracted from the first page PAGE1 and data DT2 extracted from the second page PAGE2 may be stored in the main memory 340, and each of the data DT1 and DT2 may be transmitted to the CPU 350 as the first filtered data FD1.

The CPU 350 may store the first filtered data FD1 in the internal memory 351, perform the software filtering on the first filtered data FD1 stored in the internal memory 351 using software (or firmware), and generate second filtered data FD2. The software (or firmware) may perform the software filtering using the query QUERY2.

The CPU 350 may store the second filtered data FD2 in the main memory 340 using the main memory controller 335. The second filtered data FD2 may be transmitted to the host 200 through the main memory controller 335 and the interface 355.

Figure 6:
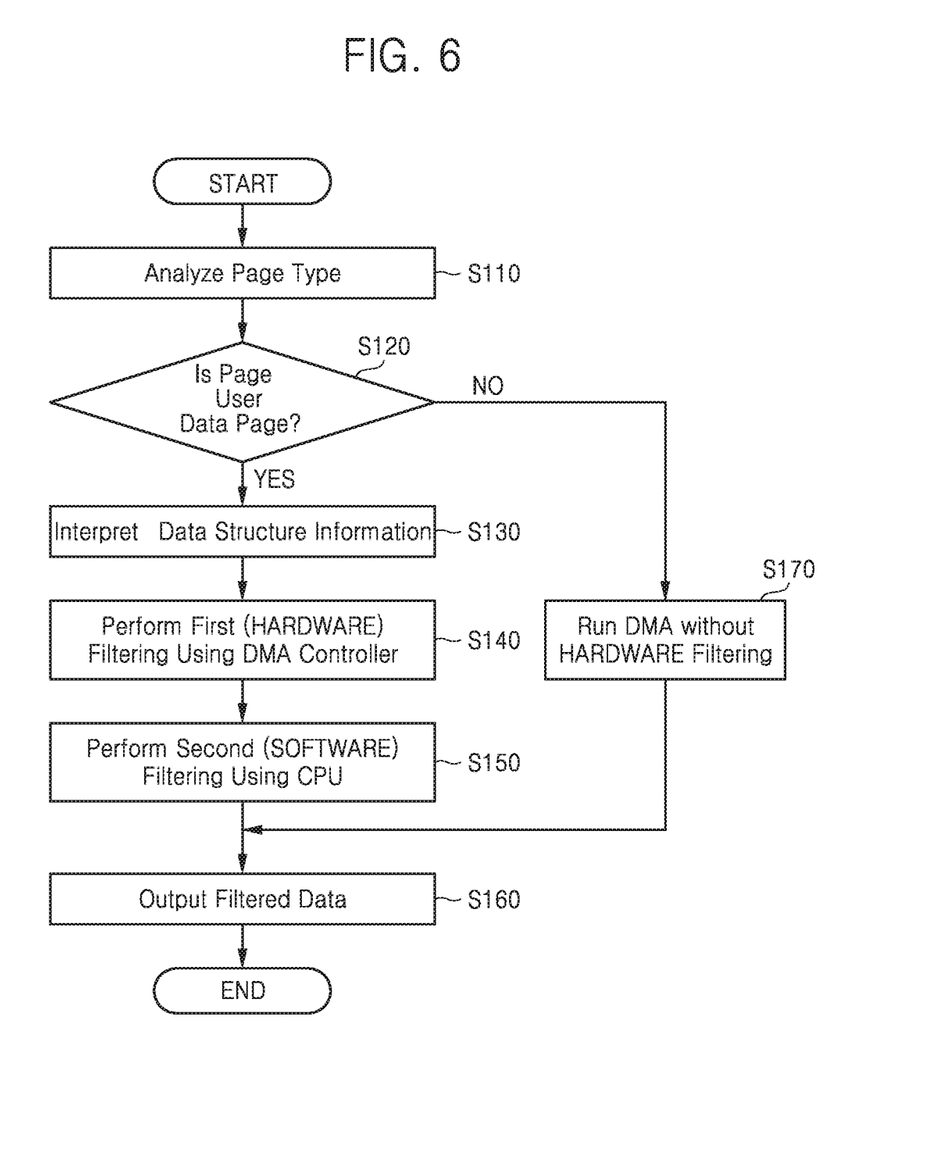
FIG. 6 is a flowchart of a method of operating the data storage device illustrated in FIG. 2 according to some embodiments of the present disclosure.

FIG. 6 is a flowchart of a method of operating the data storage device 300 illustrated in FIG. 2 according to some embodiments of the present disclosure. Referring to FIGS. 1 through 6, the page type analyzer 321 may analyze whether a page PAGE that is output from the auxiliary memory 310 is an index page IPAGE or a user data page in operation S110.

When the page PAGE is the index page IPAGE (NO in operation S120), the internal filtering module 330 may not perform the hardware filtering but may transmit the index page IPAGE from the SRAM buffer 333 to the main memory 340 using a DMA or DMA function in operation S170. In other words, the index page IPAGE may be passed (or bypassed) from the SRAM buffer 333 to the main memory 340.

However, when the page PAGE is the user data page (YES in operation S120), the internal filtering module 330 may transmit the data structure information of the page PAGE stored in the SRAM buffer 333 to the internal memory 351. The CPU 350 may analyze (or interpret) the data structure information stored in the internal memory 351 and may extract an offset and a size of each row based on the result of analyzing (or interpreting) in operation S130.

The CPU 350 may set DMA parameters in the internal filtering module 330 so that the internal filtering module 330 can perform the DMA or the DMA function on each row. At this time, the DMA parameters may include a hardware filtering condition (e.g., a condition corresponding to the query QUERY1), an address of a memory area (or region) in which a row to be read has been stored (e.g., a source address of the SRAM buffer 333), an address of an area (or region) to which filtered data will be written (e.g., a destination address of the main memory 340), a size of the row, and/or an offset of each column included in the row.

The DMA controller 331 included in the internal filtering module 330 of the data storage device 300 may perform first filtering, i.e., the hardware filtering, using the DMA parameters in operation S140. The CPU 350 of the data storage device 300 may perform second filtering, i.e., the software filtering, using the query QUERY2 and the hardware filtering result, i.e., the first filtered data FD1 in operation S150. The CPU 350 may store the software filtering result, i.e., the second filtered data FD2, in the main memory 340 through the main memory controller 335.

The index page IPAGE or the second filtered data FD2 stored in the main memory 340 may be output to the host 200 through the main memory controller 335 and the interface 355 in operation S160.

Figure 7:
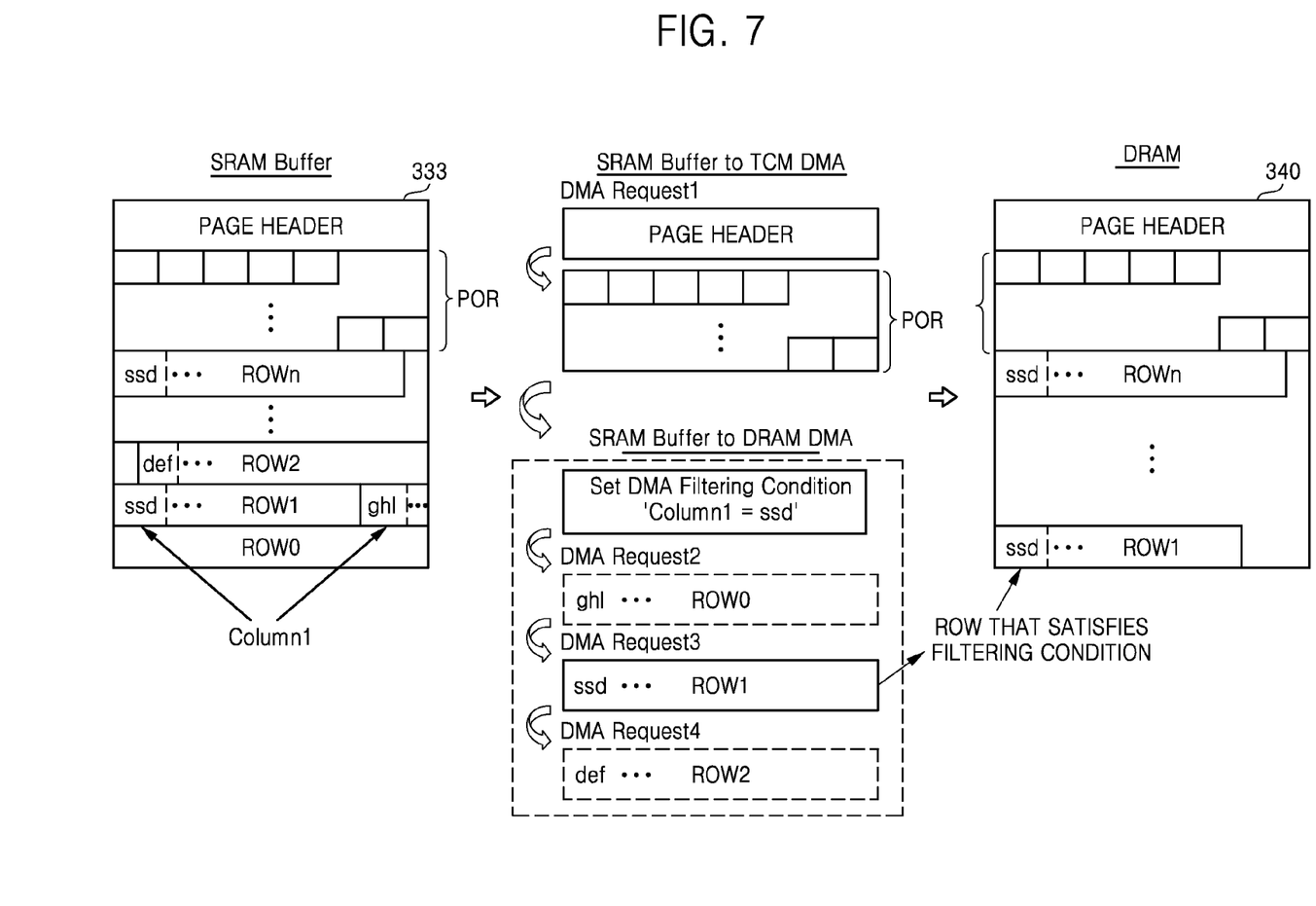
FIG. 7 is a conceptual diagram explaining operations of the data storage device illustrated in FIG. 2 according to some embodiments of the present disclosure.

FIG. 7 is a conceptual diagram explaining operations of the data storage device 300 illustrated in FIG. 2 according to some embodiments of the present disclosure. Referring to FIGS. 2, 3, 5, and 7, the data structure of the page PAGE1 or PAGE2 illustrated in FIG. 5 is different from that of the page stored in the SRAM buffer 333 illustrated in FIG. 7. Even though the data structures are different between pages, since the DMA parameters generated by the CPU 350 include the result of interpreting for the data structure information of each page, the internal filtering module 330 can perform the hardware filtering using the DMA parameters.

The data storage device 300 performing a filtering operation related with the embodiments illustrated FIG. 7 may not include a hardware accelerating logic circuit 360. A page that is output from the auxiliary memory 310 may be stored in the SRAM buffer 333.

The DMA controller 331 may store the data structure information of the page stored in the SRAM buffer 333 in the internal memory 351, e.g., the TCM, through the CPU 350 using the DMA or the DMA function. In other embodiments, the data structure information may be directly stored in the TCM by the DMA controller 331. For instance, the DMA controller 331 may store the data structure information including a page header PAGE HEADER and row pointers POR of the page stored in the SRAM buffer 333 in the TCM using the DMA request REQ (=DMA Request1).

The CPU 350 may extract an offset and a size of each row from the data structure information using software or firmware. The CPU 350 may generate the DMA parameters using the query QUERY1 and the extracted information, and may set the DMA parameters in the DMA controller 331.

For instance, the DMA parameters may include a DRAM filtering condition. As shown in FIG. 7, when the DMA filtering condition is extracting letters "ssd" from a first column Column1 in each row, the DMA controller 331 may read a first row ROW0 from the SRAM buffer 333 using the DMA request REQ (=DMA Request2) and compare letters "ghl" at the first column Column1 in the first row ROW0 with the letters "ssd" corresponding to the DMA filtering condition.

Since the letters "ghl" at the first column Column1 in the first row ROW0 is different from the letters "ssd" corresponding to the DMA filtering condition, the DMA controller 331 may not transmit the first row ROW0 to the main memory 340.

The DMA controller 331 may read a second row ROW1 from the SRAM buffer 333 using the DMA request REQ (=DMA Request3) and compare letters "ssd" at the first column Column1 in the second row ROW1 with the letters "ssd" corresponding to the DMA filtering condition. Since the letters "ssd" at the first column Column1 in the second row ROW1 equals to the letters "ssd" corresponding to the DMA filtering condition, the DMA controller 331 may transmit the second row ROW1 to the main memory 340.

The DMA controller 331 may reads a third row ROW2 from the SRAM buffer 333 using the DMA request REQ (=DMA Request4) and compare letters "def" at the first column Column1 in the third row ROW2 with the letters "ssd" corresponding to the DMA filtering condition. Since the letters "def" at the first column Column1 in the third row ROW2 is different from the letters "ssd" corresponding to the DMA filtering condition, the DMA controller 331 may not transmit the third row ROW2 to the main memory 340.

Through such a procedure, hardware-filtered rows are stored in the main memory 340. At this time, the page header PAGE HEADER and the row pointers POR may be generated by the CPU 350 and then may be stored together with the hardware-filtered rows.

Figure 8:
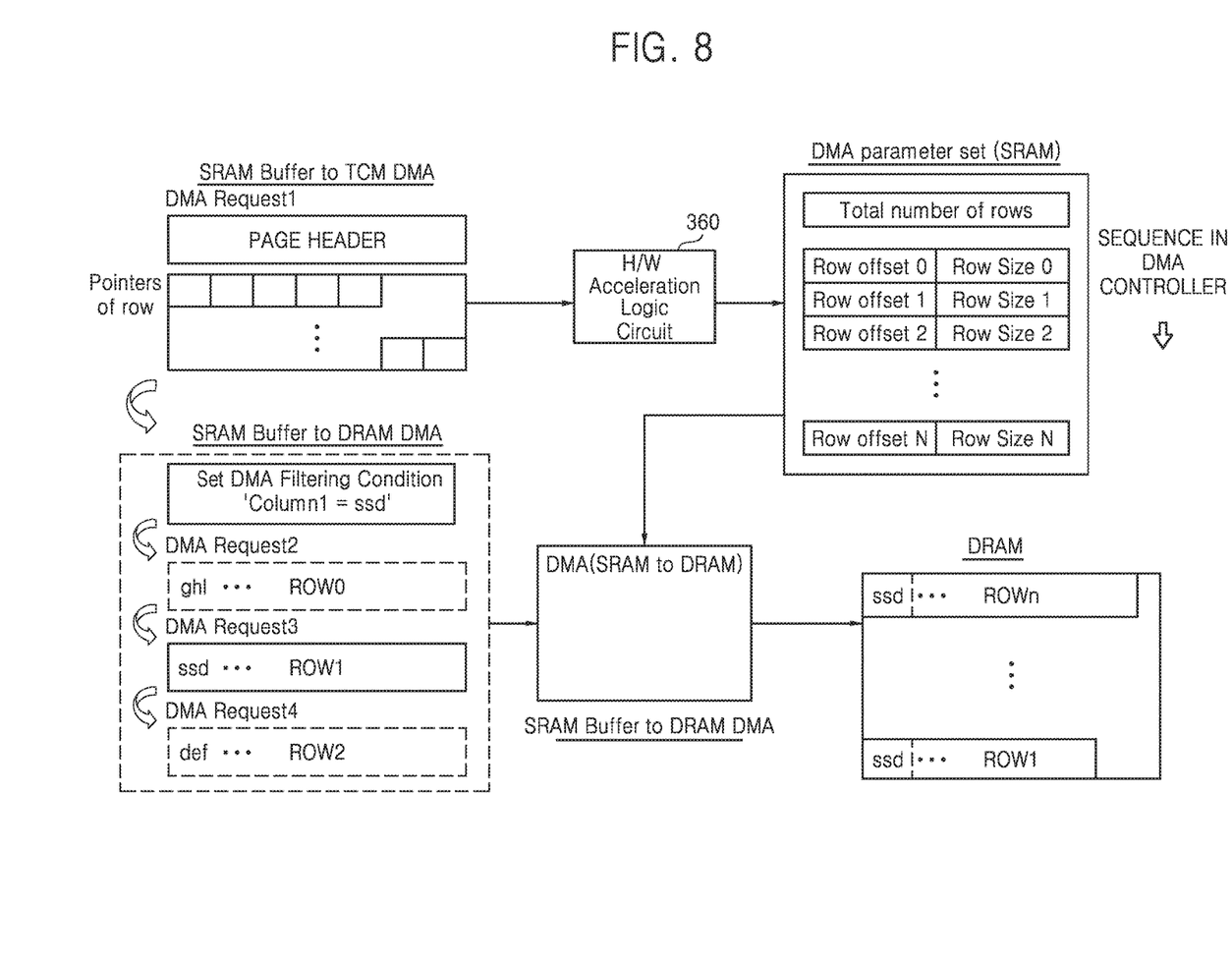
FIG. 8 is a conceptual diagram explaining operations of the data storage device illustrated in FIG. 2 according to other embodiments of the present disclosure.

FIG. 8 is a conceptual diagram explaining operations of the data storage device 300 illustrated in FIG. 2 according to other embodiments of the present disclosure. Referring to FIGS. 2, 3, 5, and 8, the data structure of the page PAGE1 or PAGE2 illustrated in FIG. 5 is different from that of a page stored in the SRAM buffer 333 illustrated in FIG. 8.

Even though the data structures are different between pages, since the DMA parameters generated by the CPU 350 may include the result of interpreting for the data structure information of each page, the internal filtering module 330 can perform the hardware filtering using the DMA parameters.

The data storage device 300 performing a filtering operation related with the embodiments illustrated FIG. 8 may include a hardware accelerating logic circuit 360. The data storage device 300 performing the filtering operation involved with the embodiments illustrated in FIG. 8 may minimize involvement of the CPU 350 in the filtering operation.

The DMA controller 331 may store the data structure information of the page stored in the SRAM buffer 333 in the TCM 351. The hardware accelerating logic circuit 360 may calculate an offset and a size of each row from the data structure information stored in the TCM 351 and store a DMA parameter set corresponding to the calculation result in an SRAM.

The SRAM may be implemented at a position that the DMA controller 331 can easily access. Accordingly, the SRAM may be implemented in the TCM 351, the hardware accelerating logic circuit 360, or the DMA controller 331. Therefore, the DMA controller 331 may sequentially read the DMA parameter set in stored in the SRAM, and may also read and filter each row from the SRAM buffer 333. As the DMA parameter set is stored in the SRAM, the CPU 350 needs to set the DMA controller 331 just once.

Operation "SRAM Buffer to DRAM DMA" illustrated in FIG. 7 is substantially the same as operation "SRAM Buffer to DRAM DMA" illustrated in FIG. 8.

Figure 9:
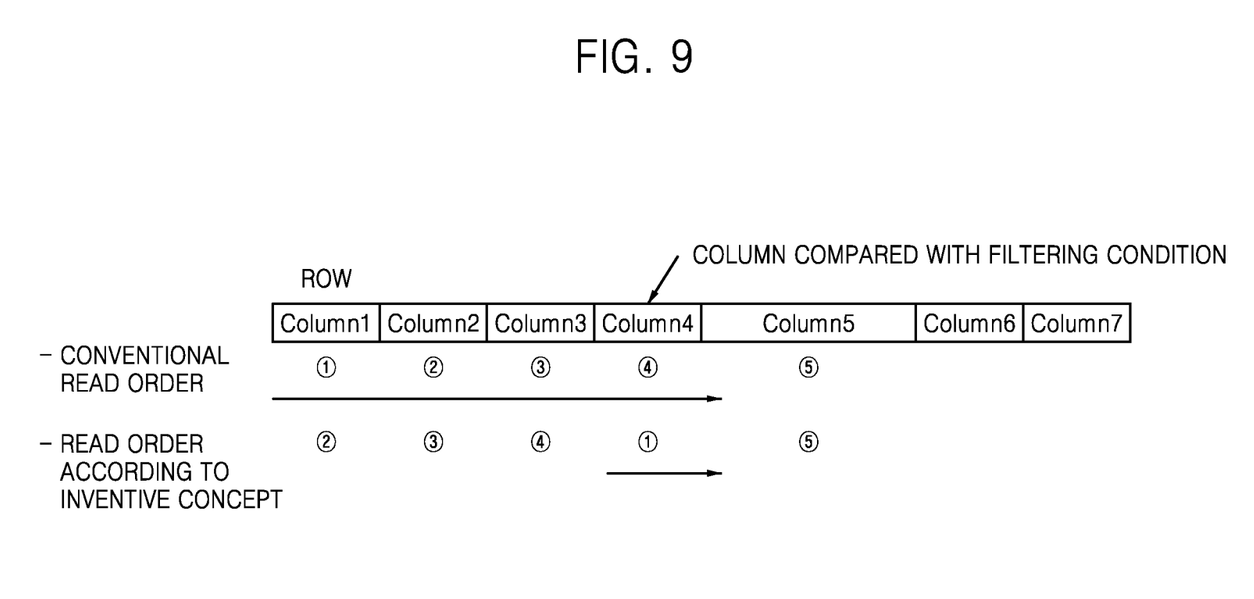
FIG. 9 is a conceptual diagram explaining a row read operation performed by the data storage device illustrated in FIG. 2.

FIG. 9 is a conceptual diagram explaining a row read operation performed by the data storage device 300 illustrated in FIG. 2. Referring to FIGS. 2 and 9, the DMA controller 331 may perform a comparison before performing the hardware filter. In other words, the DMA controller 331 may compare data corresponding to the DMA parameter or a filtering condition with data of a column which is a target of the comparison, and then may determine whether to transmit a row including the column to the main memory 340 according to the comparison result.

Conventionally, when a fourth column Column4 is a target of the comparison, a row including the fourth column Column4 may not be transmitted until read and comparison operations on the fourth column Column4 end, which results in read latency. However, the DMA controller 331 may firstly perform the read and comparison operations on a column having the highest priority, i.e., the fourth column Column4 among a plurality of columns Column1 through Column7 included in the row. In other words, the DMA controller 331 may firstly perform the hardware filtering on the fourth column Column4 having the highest priority. Therefore, the DMA controller 331 may reduce the read latency.

Referring to FIGS. 4 and 9, while the fourth column Column4 including "CITY1" in the first row is subjected to the comparison in the fourth place according to a conventional read order, it is subjected to the comparison in the first place according to the current embodiments of the present disclosure. The CPU 350 may set the comparison order in the DMA controller 331.

As described above, according to some embodiments of the present disclosure, an all-in-one data storage device may perform data search and data filtering using an internal filtering module, so that an operational amount of a CPU in a host is reduced. As a result, performance of a data management system including the all-in-one data storage device and the host may be increased.

In addition, since power consumption of the CPU and/or the internal filtering module in the data storage device is relatively less than that of the CPU in the host, the overall power consumption of the data management system may be effectively reduced. Also, when the internal filtering module is placed near to an auxiliary memory, unnecessary data transmission may be reduced in light of a data path. Consequently, the internal filtering module may transmit only hardware-filtered data to a main memory.

While the present disclosure has been particularly shown and described with reference to exemplary embodiments thereof, it will be understood by those of ordinary skill in the art that various changes in forms and details may be made therein without departing from the spirit and scope of the present disclosure as defined by the following claims.

What is claimed is:

1. A data storage device comprising:
   an internal filtering module configured to perform a filtering operation;
   a central processing unit (CPU);
   a non-volatile memory;
   a volatile memory; and
   a page type analyzer configured to analyze a type of a page that is output from the non-volatile memory and to transmit an indication signal identifying the type of the page to the CPU according to an analysis result,
   wherein according to control of the CPU that operates based on the indication signal,
   when the page output from the non-volatile memory is an index page including an index, the internal filtering module is configured to store the index page in the volatile memory, and
   when the page output from the non-volatile memory is a user page including user data, the internal filtering module is configured to filter each of a plurality of rows in the user page to provide first filtered data based on a direct memory access (DMA) parameter set, and to transmit the first filtered data to the volatile memory.

2. The data storage device of claim 1, wherein the CPU is configured to filter the first filtered data that is output from the volatile memory to provide second filtered data and transmit the second filtered data to the volatile memory.

3. The data storage device of claim 1, wherein the internal filtering module is configured to perform the filtering operation on a plurality of columns included in the plurality of rows based on a priority.

4. The data storage device of claim 1, wherein the internal filtering module is configured to process the user page in units of rows using a direct memory access (DMA) function.

5. The data storage device of claim 1, further comprising:
a low-latency memory; and
a hardware accelerating logic circuit,
wherein the internal filtering module includes a direct memory access (DMA) controller and a buffer configured to buffer the page output from the non-volatile memory, and
when the page output from the non-volatile memory is the user page,
the CPU is configured to store in the low-latency memory data structure information of the user page that is output from the buffer,
the hardware accelerating logic circuit is configured to calculate an offset and a size of each of the plurality of rows in the user page from the data structure information stored in the low-latency memory and generate the DMA parameter set corresponding to a calculation result, and
the DMA controller is configured to perform the filtering operation on each of the plurality of rows sequentially using the DMA parameter set.

6. The data storage device of claim 1, further comprising a low-latency memory,
wherein the internal filtering module includes a direct memory access (DMA) controller and a buffer configured to buffer the page output from the non-volatile memory, and
when the page output from the non-volatile memory is the user page,
the CPU is configured to store in the low-latency memory data structure information of the user page that is output from the buffer, calculate an offset and a size of each of the plurality of rows in the user page from the data structure information stored in the low-latency memory, and generate the DMA parameter set corresponding to a calculation result, and
the DMA controller is configured to perform the filtering operation on the plurality of rows using the DMA parameter set.

7. The data storage device of claim 1, further comprising a non-volatile memory controller configured to control an operation of the non-volatile memory,
wherein the non-volatile memory is a flash memory,
the volatile memory is a dynamic random access memory (DRAM),
the internal filtering module, the CPU, and the non-volatile memory controller are included in a system on chip (SoC), and
the data storage device is a solid state drive (SSD).

8. A data storage device comprising:
a non-volatile memory;
a volatile memory; and
a control circuit configured to perform data access operations including a data write operation and a data read operation, the control circuit comprising
a central processing unit (CPU),
a volatile memory controller,
a non-volatile memory controller configured to write data to the non-volatile memory or to read the data from the non-volatile memory, the non-volatile memory controller including a page type analyzer configured to analyze a type of a page that is output from the non-volatile memory and to transmit an indication signal to the CPU according to an analysis result, and
an internal filtering module configured to perform a filtering operation,
wherein according to control of the CPU, when the page output from the non-volatile memory is an index page including an index, the internal filtering module is configured to store the index page in the volatile memory, and
when the page output from the non-volatile memory is a user page including user data, the internal filtering module is configured to filter each of a plurality of rows in the user page based on a direct memory access (DMA) parameter set, to provide first filtered data and to transmit the first filtered data to the volatile memory, and
the CPU is configured to filter the first filtered data that is output from the volatile memory to provide second filtered data and transmit the second filtered data to the volatile memory.

9. The data storage device of claim 8, wherein the data storage device is configured to transmit the second filtered data to a host.

10. The data storage device of claim 8, wherein the control circuit includes an internal memory.

11. The data storage device of claim 10, wherein the internal memory is configured to store data structure information of the page output from the non-volatile memory, the data structure information including a page header and pointers.

12. The data storage device of claim 8, wherein the control circuit includes a flash CPU configured to control the non-volatile memory controller.

13. The data storage device of claim 8, wherein the internal filtering module includes a buffer and a direct memory access (DMA) controller configured to perform the filtering operation on each of the plurality of rows of the user page using the DMA parameter set.

14. A method of filtering data using a data storage device which includes a hardware filter and a central processing unit (CPU), the method comprising:
analyzing, by a page type analyzer included in the data storage device, a page that is output from a first memory in the data storage device to determine whether the page is an index page including an index or a user page including user data;
storing the page output from the first memory in a second memory using the hardware filter when a result of the analyzing is determination that the page is the index page; and
performing a two-step filtering operation on the page output from the first memory when the result of the analyzing is determination that the page is the user page,
wherein the two-step filtering operation includes filtering the user page in units of rows using the hardware filter to provide first filtered data based on a direct memory access (DMA) parameter set, transmitting the first filtered data to the second memory, filtering by the CPU the first filtered data to provide second filtered data, and transmitting the second filtered data to the second memory.

15. The method of claim 14, wherein the filtering the user page in units of rows using the hardware filter is performed on a plurality of columns included in each of the rows based on a priority.

16. The method of claim 14, further comprising transmitting an indication signal to the CPU according to the result of the analyzing.

17. The method of claim 14, wherein the hardware filter processes each of the rows of the user page using a direct memory access (DMA) function.

18. The method of claim 14, further comprising calculating an offset and a size of each of the rows from data structure information of the user page and generating the DMA parameter set corresponding to a result of the calculating.

19. The method of claim 14, further comprising analyzing by the CPU data structure information of the user page and extracting by the CPU an offset and a size of each of the rows based on a result of the analyzing by the CPU.

* * * * *